May 3, 1966

A. E. SEED 3,249,164

WEIGHING SCALE WITH RELEASABLE TORSION SPRING FOR ZERO
AND FULL CAPACITY ADJUSTMENTS

Filed May 20, 1964

INVENTOR.
ANIESE E. SEED
BY
Thomas H. Grafton
ATTORNEY

May 3, 1966
A. E. SEED
3,249,164
WEIGHING SCALE WITH RELEASABLE TORSION SPRING FOR ZERO
AND FULL CAPACITY ADJUSTMENTS
Filed May 20, 1964
3 Sheets-Sheet 2
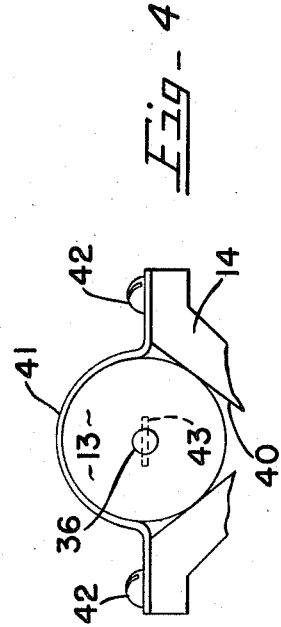
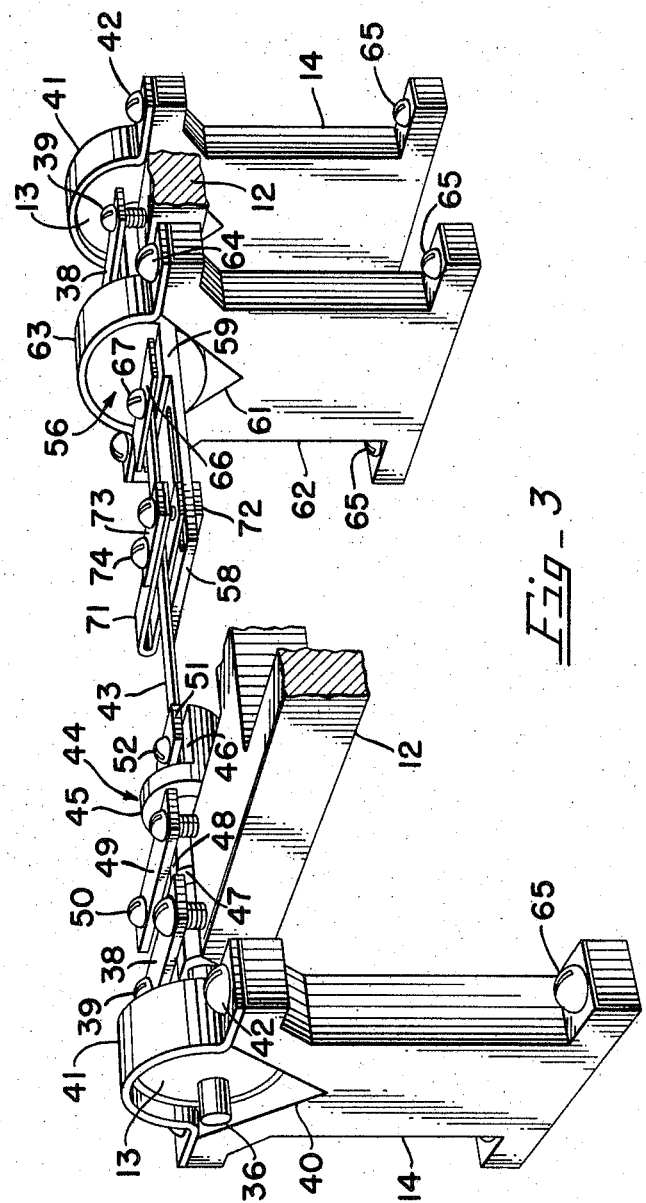
INVENTOR.
ANIESE E. SEED
BY
*Thomas H. Grafton*
ATTORNEY

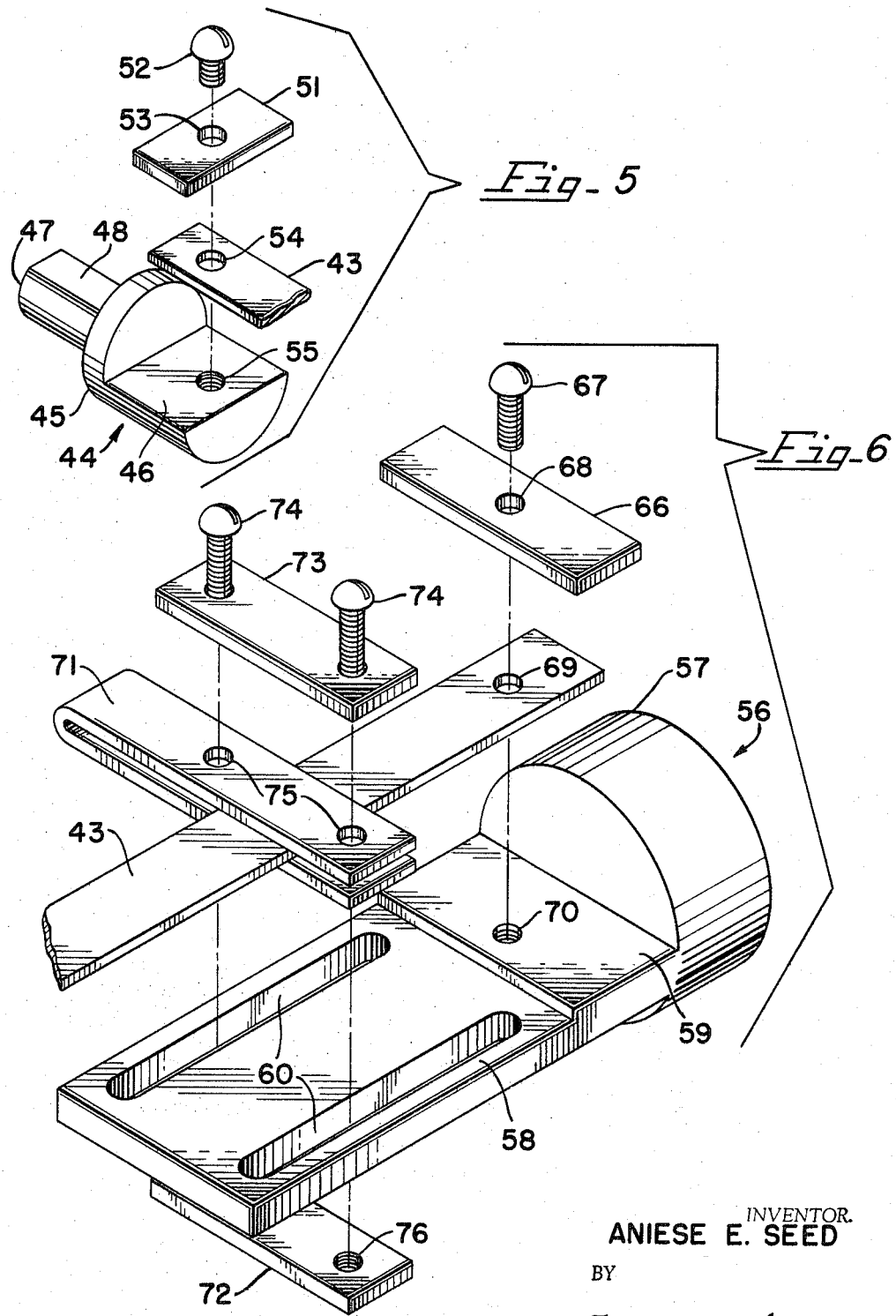

3,249,164
WEIGHING SCALE WITH RELEASABLE TORSION SPRING FOR ZERO AND FULL CAPACITY ADJUSTMENTS
Aniese E. Seed, Toledo, Ohio, assignor to Toledo Scale Corporation, Toledo, Ohio, a corporation of Ohio
Filed May 20, 1964, Ser. No. 368,841
7 Claims. (Cl. 177—225)

This invention relates to condition responsive or measuring instruments, such as weighing scales, and in particular to resilient calibrating means for adjusting the span sensitivity of such an instrument without varying zero.

In weighing scales, correcting or calibrating devices are used to insure that equal increments of load upon the scales causes uniform travel of the scales' indicating means. Correcting or calibrating devices are required to compensate for small manufacturing errors, such as eccentric pinions in ordinary rack and pinion weighing chart drives, or fundamental errors, such as departures of weighing spring counterforces from Hooke's law caused, for example, by the reduction in diameter of a helical spring during extension.

Prior resilient calibrating means, such as are shown in U.S. Patent No. 3,074,496, issued January 22, 1963, to L. S. Williams, do not vary span and zero independently. Accordingly, when using such prior calibrating devices, a span adjustment changes zero and then the zero adjustment changes the span, etc. Furthermore, the prior calibrating devices function only as correcting or calibrating means having no other function in the weighing scales.

Accordingly, the objects of this invention are to improve condition responsive or measuring devices, to increase the precision of such devices, to facilitate the mechanical adjustment of such devices, to simplify the construction of such devices, to provide improved resilient calibrating means for such devices, to provide means for adjusting the span of such devices without varying zero, to provide a span sensitivity adjustment for such devices having superior simplicity, and to provide means in weighing scales which function to adjust the span of the weighing scales and also to prevent lateral movement of the scales' levers.

One embodiment of this invention enabling the realization of these objects is a span sensitivity adjustment device which includes a torsion spring having one end connected to a ball bearing lever of a projected indication weighing scale coaxially with the axis of fulcrum rotation and its other end anchored. The anchor is released when the scale is at zero to allow the torsion spring to seek its natural position and then the spring is reanchored. Adjustment of the span is accomplished by changing the effective length of the torsion spring, thereby changing the spring rate.

The torsion spring also functions to prevent lateral movement of the ball bearing lever, thereby maintaining the focus of the optical system in the projected indication scale.

In accordance with the above, one feature of this invention resides in the ability of the span sensitivity adjustment to vary the span without varying zero (torsion spring allowed to seek its natural position at zero). The span of a weighing scale is the travel of its weight indicator after a full capacity load is placed upon the scale. For example, if the capacity of the scale is fifty pounds and a fifty pound weight is placed upon the scale, the scale's indicator should travel from zero to fifty pounds indication (span). In a weighing scale incorporating the span sensitivity adjustment of the invention, the scale is set to read zero when no load is upon the scale, this adjustment being completely independent of the span adjustment. Then, the span is adjusted while a full capacity test weight is upon the scale until the scale indicates the correct weight of such test weight.

Another feature resides in the double function of the span sensitivity adjustment device which prevents lateral movement of the ball bearing lever. This permits simplification by eliminating the need for shoulders on the bearing shafts and thrust members, which heretofore functioned to limit lateral movements of the lever. It has been found that this new means for preventing lateral movement of the ball bearing lever reduces back error.

The above and other objects and features of this invention will be appreciated more fully from the following detailed description when read with reference to the accompanying drawings wherein:

FIG. 3 is an enlarged, fragmentary perspective view of a portion of the mechanism shown in FIG. 1;

FIG. 4 is an enlarged, fragmentary end elevational view as seen looking toward the left hand end of the mechanism as viewed in FIG. 3;

FIG. 5 is an enlarged, fragmentary exploded view in perspective of the left hand portion of the mechanism as viewed in FIG. 2; and FIG. 6 is an enlarged, fragmentary exploded view in perspective of the right hand portion of the mechanism as viewed in FIG. 2.

Figure 1:
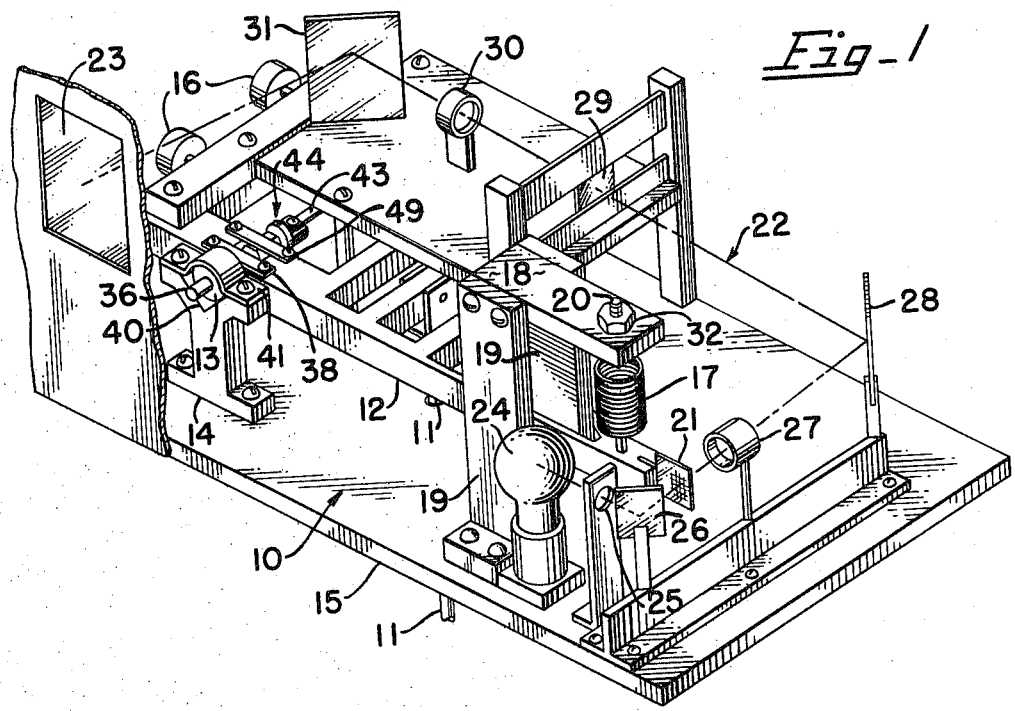
FIG. 1 is a schematic representation in perspective of a projected indication weighing scale incorporating the span sensitivity adjustment of this invention.

Referring to the drawings, in FIG. 1 a span sensitivity adjustment device as contemplated in this invention is shown in combination with a projected indication weighing scale 10 such as is shown in U.S. application Serial No. 313,371, filed October 2, 1963 now Patent No. 3,173,032, in the name of Orval J. Martin. In order to prevent undue complexity, only the parts of a typical scale which are essential to bring out the details of the span sensitivity adjustment device are shown. The weighing scale includes a platform and load supporting levers therefor, neither being shown, to which a load to be weighed is applied. A rod 11 has one end connected to the output lever of the load supporting lever system and has its other end connected to a lever 12. The lever 12 is fulcrumed on lever support bearings 13 (both shown in FIG. 3) which are cradled on fulcrum stand 14, the fulcrum stands 14 being supported on a base plate 15. Counterweights 16 are carried by the lever 12 and function to balance the scale under no load condition. A counterforce spring 17 connects the end of the lever 12 remote from its fulcrum to a horizontal plate 18 supported by a pair of legs 19 extending upwardly from the base plate 15, the spring 17 providing most of the load counterbalancing force and, accordingly, balancing most of the forces created due to the application of a load upon the scale platform. The upper end of the spring 17 is connected to the horizontal plate 18 by means of a threaded pin 20 connected to the spring and mounted to slide in the plate 18 axially but not to rotate and a nut 32 which functions as a means to vertically position the pin and, thus, the end of the lever for the purpose of adjusting the zero indication of the scale in a conventional manner.

The weighing scale 10 includes an optical load readout system as described in the above U.S. application Serial No. 313,371. Included in the readout system is an indicia bearing chart 21 carried by the lever 12 for movement therewith. An image projecting path, generally designated by numeral 22 in FIG. 1, results in a visual weight indication on a display screen 23. The optical projecting system includes a light source 24, a condensing lens 25, a reflector 26 arranged to reflect a beam of light generally normal to the chart 21, a projection lens 27, a mirror 28 arranged to bend the light beam ninety degrees, projection lenses 29 and 30, and a mirror 31 which reflects the indicia images onto the screen 23, such elements being supported from the base plate 15 and being arranged and functioning as described in the above U.S. application Serial No. 313,371.

The end of the lever 12 remote from the counterforce spring 17 includes a rectangular portion 33 (FIG. 2) which defines an opening 34 within which the span sensitivity adjustment device 35 of the invention is located. The pivotal connections for fulcruming the lever 12 each includes a stud 36 that is positioned in a transverse groove 37 milled in the upperside of the lever and clamped by a cover plate 38 attached to the lever by means of a pair of screws 39. The studs 36 extend laterally either side of the side portions of the lever 12 and are received in the ball bearings 13 that are clamped in V-grooves 40 of the fulcrum stands 14 by means of straps 41 fitting over the bearing housings and held in place by screws 42.

Figure 2:
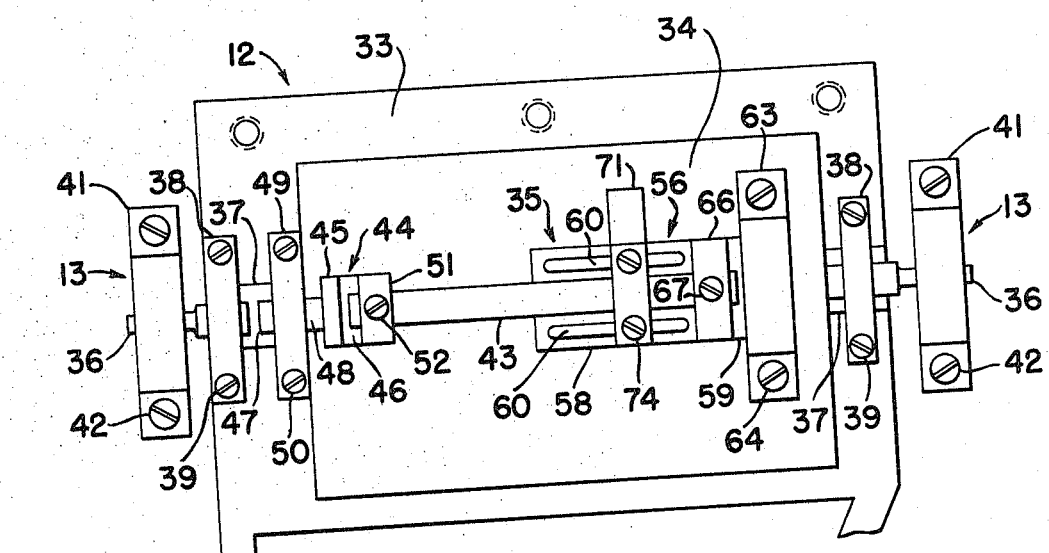
FIG. 2 is an enlarged, fragmentary plan view of a portion of the ball bearing lever shown in FIG. 1.

The span sensitivity adjustment device 35 includes a torsion spring 43 having its left end as viewed in FIG. 2 connected to the lever 12 coaxially with the axis of fulcrum rotation and its other end anchored. The anchor is released when the scale is at zero to allow the torsion spring 43 to seek its natural position and then the spring 43 is reanchored. Adjustment of the span of the scale 10 is accomplished by changing the effective length of the torsion spring 43, thereby changing the spring rate.

The torsion spring 43 is connected to the lever 12 by means including a connector 44 having a cylindrical portion 45, on which is formed a flat 46 which receives the end of the torsion spring 43, and a reduced cylindrical extension 47, on which is formed a flat 48. The extension 47 of the connector 44 is received in the transverse groove 37 of the lever 12 and is held in the groove 37 by means of a cover plate 49 attached to the lever by means of a pair of screws 50, the cover plate 49 bearing on the flat 48. The end of the torsion spring 43 is clamped on the flat 46 of the connector 44 by means of a plate 51 and a screw 52 which extends through holes 53 and 54 (FIG. 5) in the plate 51 and spring 43, respectively, and is screwed into a tapped hole 55 in the connector 44. As shown in FIG. 4, the turning axis and the twisting axis coincide, i.e., the axis of rotation of the stud 36 in the ball bearing 13 and the twisting axis of the torsion spring 43 coincide.

The right hand end of the torsion spring 43 as viewed in FIG. 2 is anchored by means including a connector 56 having a cylindrical portion 57 on which are formed stepped flats 58 and 59, the flat 58 being provided with two slots 60 as shown in FIGS. 2 and 6 that extend either side of and parallel to the longitudinal axis of the torsion spring 43. The cylindrical portion 57 of the connector 56 is received in a V-groove 61 of a stand 62 (FIG. 3) erected from the base plate 15, the stand 62 being exactly like the fulcrum stands 14 and the connector 56 being held in its V-groove 61 by means of a strap 63 and screws 64 in the same manner as the ball bearings 13 are held in place by means of the straps 41 and screws 42. The stands 14 and 62 are held on the base plate 15 by means of screws 65. The end of the torsion spring 43 is clamped on the higher one of the two steps, i.e., on step 59, by means of a plate 66 and a screw 67 which extends through holes 68 and 69 (FIG. 6) in the plate 66 and spring 43, respectively, and is threaded in a tapped hole 70 in the step 59. The torsion spring 43 is received between the legs of an elongated, recumbent U-shaped clamp 71 and is clamped between such legs by means of a pair of plates 72 and 73 and two screws 74 which extend through holes in the plate 73, holes 75 in the U-shaped clamp 71, and the slots 60 in the connector 56, and are threaded into tapped holes 76 in the plate 72, the plate 72 bearing against the underside of the connector 56 and the plate 73 bearing against the upper side of the clamp 71 as shown in FIG. 3.

The step 59 and the bottom leg of the U-clamp hold the torsion spring 43 up off the step 58, the left hand edges of the legs of the U-clamp as viewed in FIG. 2 serving as a fulcrum. Accordingly, the effective length of the torsion spring 43 is its length between such fulcrum and the right hand edge of the plate 51 as viewed in FIG. 2. The effective length of the torsion spring 43 is changed by loosening the screws 74 and sliding the U-clamp 71 along the step 58, thereby changing the spring rate of the spring 43. The left hand surfaces of the legs of the U-clamp as viewed in FIG. 2 are ground so that the top and bottom surfaces are in the same plane (makes a sharp bending edge).

Adjustment of the span of the scale 10 is accomplished by releasing the anchor when the scale is at zero (accomplished by loosening the strap 63) to allow the torsion spring 43 to seek its natural position, i.e., the spring 43 can rotate the connector 56 in its V-groove 61 when the strap 63 is loose, reanchoring the spring 43, and then changing the effective length of the spring 43 by sliding the U-clamp 71 one direction or the other. Since the torsion spring 43 puts no force on the lever 12 at zero, it is possible to vary the span without varying zero (orthogonal system). In operation, when no load is upon the scale, the scale is set at zero by turning nut 32 (FIG. 1), and then, when a full capacity test weight is upon the scale, the scale is set to indicate the full capacity load by sliding the U-clamp 71 one direction or the other as described above (span adjustment). The torsion spring 43 is connected to the lever 12 coaxially with the axis of fulcrum rotation (preferred location) so that the lever applies torque free of any moments to the spring, i.e., the lever in operation twists the spring only. However, the system would be operative if the spring 43 was shifted somewhat, for example, to the right or left as viewed in FIG. 4. The torsion spring 43 and its adjuncts are resilient calibrating means for adjusting the sensitivity of the scale, the spring 43 applying a suitable correction effect to the scale as the spring is twisted by the lever in operation. This correction effect is varied by varying the spring rate of the spring 43 as described above.

The torsion spring 43 also functions to prevent lateral movement of the ball bearing lever 12, thereby, in the particular system shown in FIG. 1, maintaining the focus of the optical system. This permits simplification by eliminating the need for shoulders on the bearing shafts (studs 36) and the need for thrust members, which heretofore functioned to limit lateral movement of the lever. The torsion spring 43 also functions similarly in connection with levers pivotally mounted by knife-edge pivots. This new means for preventing lateral movement of the ball bearing lever 12 reduces back error in the scale shown in FIG. 1.

It is to be understood that the above description is illustrative of this invention and that various modifications thereof can be utilized without departing from its spirit and scope.

Having described the invention, I claim:

1. A weighing scale comprising, in combination, a pivotally mounted lever, a stationarily mounted member, a torsion spring extending parallel to the pivotal axis of the lever, first and second connecting means for connecting the torsion spring to the lever and member, one of the connecting means being for releasing the torsion spring when the scale is at zero indication so that the torsion spring can seek its untwisted position, and means for adjusting the torsion spring after the scale has been set at zero to adjust the scale at its full capacity position without changing the zero adjustment.

2. In a force responsive mechanism having a system of elements movable from zero to full capacity, in combination a pivotally mounted member, zero adjustment means for adjusting the member to a zero capacity position, and resilient span adjustment means independent of the zero adjustment means and thus operable without varying the zero setting for adjusting the member to a full capacity position.

3. In a condition responsive mechanism in accordance with claim 2 wherein the span adjustment means includes a torsion spring mounted coaxially with the axis of rotation of the pivotally mounted member.

4. In a condition responsive mechanism in accordance with claim 2 wherein the span adjustment means includes a torsion spring and adjusts the member by varying the spring rate of the spring.

5. A weighing scale comprising, in combination, a pivotally mounted lever, a stationarily mounted stand, a torsion spring extending parallel to the pivotal axis of the lever, first means for connecting one end of the spring to the lever, and second means for connecting the other end of the spring to the stand, the second means including a connector having a cylindrical portion on the stand and a clamp so holding the cylindrical portion on the stand that upon release of the clamp when the scale is at zero indication the cylindrical portion is turned by the torsion spring as the spring seeks its untwisted position.

6. A weighing scale according to claim 5 wherein adjustment means are provided for varying the spring rate of the spring.

7. A weighing scale according to claim 6 wherein the pivotal axis of the lever and the twisting axis of the torsion spring coincide.

References Cited by the Examiner

UNITED STATES PATENTS

| 339,946 | 4/1886 | Springer et al. | 177—247 |
|---|---|---|---|
| 1,617,823 | 2/1927 | Ryber | 73—383 |
| 2,185,582 | 1/1940 | Blau | 73—383 |
| 2,417,392 | 3/1947 | Craig et al. | 88—24 |
| 2,574,395 | 11/1951 | Jack et al. | 73—382 |
| 2,613,926 | 10/1952 | Gorbach | 177—196 X |
| 2,883,140 | 4/1959 | Stafford | 177—68 |
| 3,154,161 | 10/1964 | Russell | 177—196 |

LOUIS J. CAPOZI, *Primary Examiner.*

LEO SMILOW, *Examiner.*

G. J. PORTER, ROBERT S. WARD,
*Assistant Examiners.*